(12) United States Patent
Peng et al.

(10) Patent No.: US 12,143,791 B2
(45) Date of Patent: Nov. 12, 2024

(54) VIBRATING DIAPHRAGM OF SOUND-PRODUCING APPARATUS AND SOUND-PRODUCING APPARATUS

(71) Applicant: Goertek Inc., Shandong (CN)

(72) Inventors: Weifeng Peng, Weifang (CN); Fengguang Ling, Weifang (CN); Chun Li, Weifang (CN); Chunfa Liu, Weifang (CN)

(73) Assignee: Goertek Inc., Shandong (CN)

( * ) Notice: Subject to any disclaimer, the term of this patent is extended or adjusted under 35 U.S.C. 154(b) by 0 days.

(21) Appl. No.: 17/767,561

(22) PCT Filed: Dec. 25, 2019

(86) PCT No.: PCT/CN2019/128174
§ 371 (c)(1),
(2) Date: Apr. 8, 2022

(87) PCT Pub. No.: WO2021/082255
PCT Pub. Date: May 6, 2021

(65) Prior Publication Data
US 2024/0114291 A1    Apr. 4, 2024

(30) Foreign Application Priority Data

Oct. 31, 2019 (CN) .......................... 201911058555.0

(51) Int. Cl.
| | |
|---|---|
| *H04R 7/04* | (2006.01) |
| *C08J 5/04* | (2006.01) |
| *C08J 7/04* | (2020.01) |
| *C08K 3/06* | (2006.01) |
| *C08K 5/00* | (2006.01) |
| *C08K 5/40* | (2006.01) |

(52) U.S. Cl.
CPC .............. *H04R 7/04* (2013.01); *C08J 5/0405* (2021.05); *C08J 7/042* (2013.01); *C08K 3/06* (2013.01); *C08K 5/0016* (2013.01); *C08K 5/40* (2013.01); *C08J 2381/04* (2013.01); *H04R 2307/025* (2013.01); *H04R 2307/029* (2013.01)

(58) Field of Classification Search
CPC ................ H04R 7/04; H04R 2307/029; H04R 2307/025
See application file for complete search history.

(56) References Cited

U.S. PATENT DOCUMENTS 4,429,068 A * 1/1984 Nakahira ................ B60C 7/102
524/304

FOREIGN PATENT DOCUMENTS

| CN | 106817658 A | * | 6/2017 | ............. H04R 7/127 |
| CN | 110370701 A | | 10/2019 | |

OTHER PUBLICATIONS

Burkhardi , Liquid Polyfide Polymers for Chemical- and Solvent-Resistant sealants, pp. 19-23, Aug. 2018. (Year: 2018).*

* cited by examiner

*Primary Examiner* — Sunita Joshi
(74) *Attorney, Agent, or Firm* — Baker Botts LLP

(57) ABSTRACT

Provided is a vibrating diaphragm of a sound-producing apparatus. The vibrating diaphragm includes at least one elastomer layer, wherein the elastomer layer is made from polysulfide rubber; the polysulfide rubber is any one of type A polysulfide rubber, type FA polysulfide rubber and type ST polysulfide rubber, and a molecular weight of the polysulfide rubber is 1000-500000.

19 Claims, 3 Drawing Sheets

VIBRATING DIAPHRAGM OF SOUND-PRODUCING APPARATUS AND SOUND-PRODUCING APPARATUS

CROSS-REFERENCE TO RELATED APPLICATIONS

This application is a National Stage of International Application No. PCT/CN2019/128174, filed on Dec. 25, 2019, which claims priority to Chinese Patent Application No. 201911058555.0, filed on Oct. 31, 2019, both of which are hereby incorporated by reference in their entireties.

TECHNICAL FIELD

The present disclosure relates to the technical field of acoustical devices, in particular to a vibrating diaphragm for a sound-producing apparatus and the sound-producing apparatus.

BACKGROUND

Most existing vibrating diaphragms of the sound-producing apparatus are structures formed as a composition of a high modulus plastic film layer (for example, PEEK, PAR, PEI, PI and etc.), a relatively flexible thermoplastic polyurethane elastomer (for example TPU) and a damping adhesive film (for example, acrylic glue, silica gel and etc.). However, existing vibrating diaphragms are relatively poor in comprehensive performance; for example, they suffer from low elastic recovery rate and poor heat resistance, and tend to cause poor sounding and poor acoustic performance of the sound-producing apparatus.

A silicone rubber material has good thermal stability, good hydrophobic property and excellent resilient property. Nowadays, with increasing demands on high power, waterproof and high tone quality requirements, the vibrating diaphragm made from the silicone rubber material is widely applied in the field of sound-producing apparatus. However, although the silicone rubber material is relatively good in thermal stability and resilience, the modulus or hardness of the silicone rubber is relatively low as a result of its symmetrical chemical structure, high stereoregularity and small symmetrically substituted methyl steric hindrance. Accordingly, on the premise of meeting the same demands on F0, the damping property of the material is relatively low, resulting in relatively large distortion of a product of a silicon rubber vibrating diaphragm.

It can be seen that the above mentioned vibrating diaphragm are relatively poor in comprehensive performance, and cannot meet the comprehensive performance demands on the miniature sound-producing apparatus. Accordingly, it has become a technical challenge in this field to provide a vibrating diaphragm of the sound-producing apparatus with high comprehensive performance and high reliability.

SUMMARY

An object of the present disclosure is to provide a novel technical scheme of a vibrating diaphragm of a sound-producing apparatus and the sound-producing apparatus.

According to one aspect of the present disclosure, provided is a vibrating diaphragm of a sound-producing apparatus, the vibrating diaphragm including at least one elastomer layer, wherein the elastomer layer is made from polysulfide rubber;

the polysulfide rubber is any one of type A polysulfide rubber, type FA polysulfide rubber and type ST polysulfide rubber; and a molecular weight of the polysulfide rubber is 1000-500000.

Optionally, a molecular structural formula of the polysulfide rubber is as follows:

In the molecular structural formula, R is a bivalent organic radical;

L is a polysulfide rubber molecular chain segment;

X is any one of sulfhydryl, hydroxyl, halogen, amino and amide; and m is 1 or 2.

Optionally, the R includes any one of bivalent organic radicals:

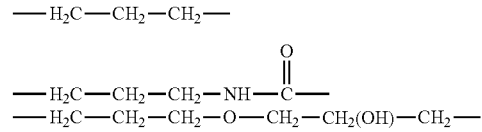

Optionally, an inorganic filler reinforcing agent is blended in the polysulfide rubber, the inorganic filler reinforcing agent is at least one of carbon black, white carbon black, nano titanium dioxide, talc powder, precipitated calcium carbonate and barium sulfate, and a content of the inorganic filler reinforcing agent is 15% to 90% of a total amount of the polysulfide rubber.

Optionally, the content of the inorganic filler reinforcing agent is 30% to 70% of the total amount of the polysulfide rubber.

Optionally, an antiaging agent is blended in the polysulfide rubber, the antiaging agent is at least one of antiaging agent N-445, antiaging agent 246, antiaging agent 4010, antiaging agent SP, antiaging agent RD, antiaging agent ODA, antiaging agent OD and antiaging agent WH-02, the mass fraction of the nitrile rubber is 100 parts, and the content of the antiaging agent is 0.5% to 10% of the total amount of the polysulfide rubber.

Optionally, the content of the antiaging agent is 1% to 5% of the total amount of the polysulfide rubber.

Optionally, a plasticizer is blended in the polysulfide rubber, the plasticizer is at least one of an aliphatic diester plasticizer, a phthalate plasticizer, a benzene polyacid plasticizer, a benzoate plasticizer, a polyalcohol ester plasticizer, a chlorinated hydrocarbon plasticizer, an epoxy plasticizer, a citrate plasticizer and a polyester plasticizer, and the content of the plasticizer is 1% to 10% of the total amount of polysulfide rubber.

Optionally, the content of the plasticizer is 3% to 7% of the total amount of the polysulfide rubber.

Optionally, an internal releasing agent is blended in the polysulfide rubber, the internal releasing agent is at least one of stearic acid, octadecylamine, alkyl phosphate and α-octadecyl-w-hydroxyl polyoxyethylene phosphate, and the content of the internal releasing agent is 0.5 to 5% of the total amount of the polysulfide rubber.

Optionally, the content of the internal releasing agent is 1 to 3% of the total amount of the polysulfide rubber.

Optionally, a crosslinking agent is blended in the polysulfide rubber, and the crosslinking agent is at least one of sulfur and a thiuram polysulfide.

Optionally, the thiuram polysulfide is at least one of tetramethylthiuram monosulfide, tetramethylthiuram disulfide, tetraethylthiuram disulfide, tetrabutylthiuram disulfide, diisobutylthiuram disulfide, bis(1,5-pentylidene) thiuram tetrasulfide.

Optionally, the vibrating diaphragm is a single-layered vibrating diaphragm, and the single-layered vibrating diaphragm is composed of a polysulfide rubber film layer; or the vibrating diaphragm is a composite vibrating diaphragm, the composite vibrating diaphragm includes two, three, four or five film layers, and the composite vibrating diaphragm at least includes one polysulfide rubber film layer.

Optionally, a thickness of the polysulfide rubber film layer is 10 μm to 200 μm.

Optionally, a thickness of the polysulfide rubber film layer is 30 μm to 200 μm.

Optionally, a hardness range of the polysulfide rubber is 30A to 95A.

Optionally, a glass-transition temperature of the polysulfide rubber ranges from −70° C. to 0° C.

Optionally, a loss factor of the polysulfide rubber at a room temperature is greater than 0.06.

Optionally, an elongation at break of the polysulfide rubber is greater than 100%.

According to another aspect of the present disclosure, a sound-producing apparatus is provided. The sound-producing apparatus includes a sound-producing apparatus main body and the vibrating diaphragm, the vibrating diaphragm being provided on the sound-producing apparatus main body and the vibrating diaphragm being configured to vibrate to generate a sound.

The inventors of the present disclosure found that in the prior art, the vibrating diaphragm is poor in comprehensive performance, and the acoustic performance of the sound-producing apparatus is easily influenced as a result of poor audition. Thus, the technical task to be achieved or the technical problem to be solved is never thought or unexpected by those skilled in the art, such that the present disclosure is a novel technical scheme.

The present disclosure has the beneficial effects that: the present disclosure discloses a vibrating diaphragm made from the polysulfide rubber material, the vibrating diaphragm is good in comprehensive performance, can work normally under high and low-temperature extreme conditions and can keep good rigidity, rebound resilience and damping property. Thus, the sound-producing apparatus can be applied to an extremely severe environment, and can keep a good state of the acoustic performance thereof.

Other features and advantages of the present disclosure will be readily apparent from the following detailed description of exemplary embodiments of the present disclosure with reference to the drawings.

BRIEF DESCRIPTION OF THE DRAWINGS

The accompanying drawings, which are incorporated into this specification and constitute a part thereof, illustrate embodiments of the present disclosure and, together with the description, serve to explain the principles of the present disclosure.

DETAILED DESCRIPTION

Figure 1:
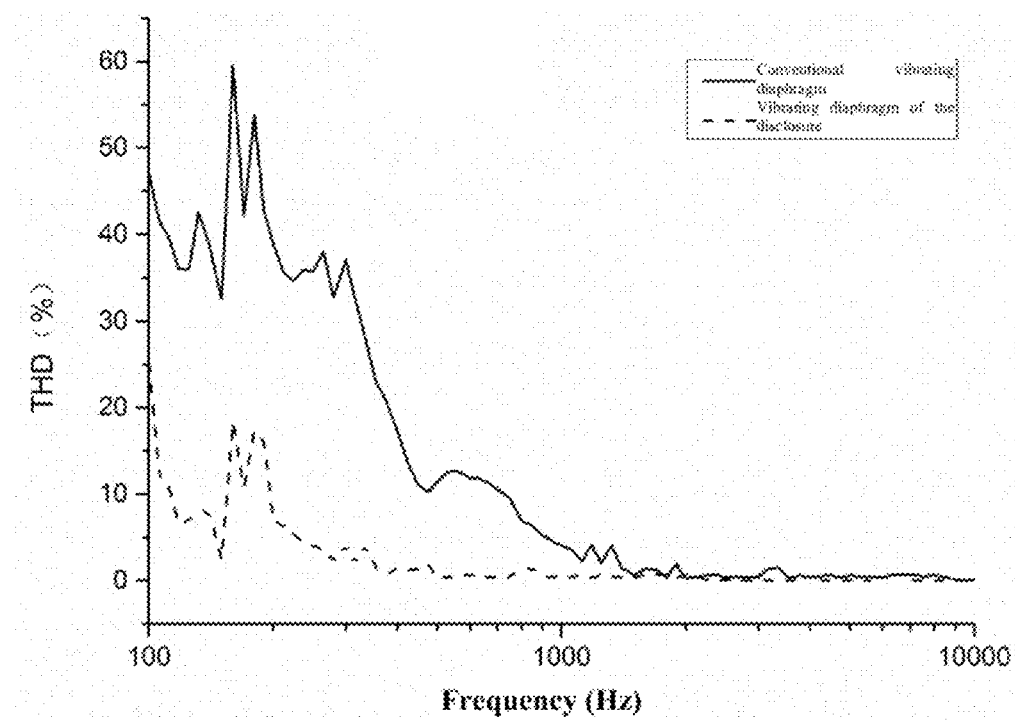
FIG. 1 is a test curve comparison diagram of total harmonic distortion of the vibrating diaphragm provided by the present disclosure and a conventional vibrating diaphragm.

Detail description on the various exemplary embodiments of the present disclosure will be made below with reference to the drawings. It is to be noted that unless otherwise specified, relative arrangement, digital expression formulae and numerical values of components and steps illustrated in these embodiments do not limit the scope of the present disclosure.

Description to at least one exemplary embodiment is in fact illustrative only, and is in no way limiting to the present disclosure or application or use thereof.

Techniques, methods and devices known to those skilled in the prior art may not be discussed in detail; however, the techniques, methods and devices shall be regarded as part of the description where appropriate.

In all the illustrated and discussed examples, any specific value shall be explained as only exemplary rather than restrictive. Thus, other examples of exemplary embodiments may have different values.

It is to be noted that similar reference numbers and alphabetical letters represent similar items in the drawings below, such that once a certain item is defined in a drawing, further discussion thereon in the subsequent drawings is no longer necessary.

According to an embodiment of the present disclosure, provided is a vibrating diaphragm of a sound-producing apparatus. The vibrating diaphragm includes at least one elastomer layer, wherein the elastomer layer is made from polysulfide rubber. The vibrating diaphragm can be applied to sound-producing apparatuses such as a speaker, in particular to a miniature sound-producing apparatus.

The polysulfide rubber may be any one of type A polysulfide rubber, type FA polysulfide rubber and type ST polysulfide rubber. Specifically speaking, the type A polysulfide rubber is a polycondensate of dichloroethane and an alkali metal tetrasulfide. The type FA polysulfide rubber is a polycondensate of dichloroethane, bis-2-chloroethyl formaldehyde and an alkali metal disulfide. The type ST polysulfide rubber is a polycondensate of bis-2-chloroethyl formaldehyde, trichloropropane and an alkali metal polysulfide. Those skilled in the art can select any one of three types of polysulfide rubber flexibly as needed to manufacture the vibrating diaphragm of the sound-producing apparatus. The prepared vibrating diaphragm has good rigidity, rebound resilience and damping property.

The molecular weight of the polysulfide rubber is relatively large, and the molecular weight thereof can reach 1000-500000.

The molecular structural formula of the polysulfide rubber can be as follows:

wherein R is a bivalent organic radical, L is a polysulfide rubber molecular chain segment, X is any one of sulfhydryl, hydroxyl, halogen (for example, F, Cl, Br, I and etc.), amino and amide, and m is 1 or 2. It is to be noted that in the present disclosure, a polysulfide rubber structure includes, but not limited to the above structure.

Optionally, the R includes any one of bivalent organic radicals:

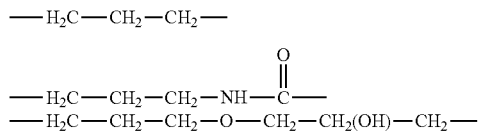

In particular, a polysulfide rubber main chain is composed of single bonds totally. As each bond can rotate spatially, the polysulfide rubber is relatively large in flexibility, thereby facilitating movement or swing of the molecular chain segment thereof. Thus, the polysulfide rubber has a relatively low glass-transition temperature, which brings excellent cold resistance to the polysulfide rubber material, such that it further can keep good high elasticity in a low-temperature environment. On the other hand, it enables two molecules of a bonding system to be close to each other and generate an adsorption force, such that it has a good bonding property, which brings convenience to a component bonding process of the sound-producing apparatus.

The vibrating diaphragm provided by the present disclosure is good in comprehensive performance, specifically, it can work normally under an extreme condition while keeping good rigidity, rebound resilience and damping capacity, and is relatively low in distortion. Thus, the sound-producing apparatus applying the vibrating diaphragm can be applied to an extremely severe environment, and meanwhile can keep a good state of the acoustic performance thereof.

Optionally, an inorganic filler reinforcing agent can be blended in the polysulfide rubber. The inorganic filler reinforcing agent includes at least one of carbon black, white carbon black, nano titanium dioxide, talc powder, precipitated calcium carbonate and barium sulfate. Further, under a circumstance that the mass fraction of the polysulfide rubber is 100 parts, the mass fraction of the inorganic filler reinforcing agent is 15 to 90 parts, that is, the content of the inorganic filler reinforcing agent is 15% to 90% of a total amount of the polysulfide rubber.

The surface of the inorganic filler reinforcing agent has radicals such as hydrogen, carboxyl, lactonyl, free radical, quinonyl and the like capable of being substituted, reduced, oxidized and the like. After the inorganic filler reinforcing agent is blended into the polysulfide rubber, as a result of a strong interaction between the inorganic filler reinforcing agent and an interface of the polysulfide rubber molecular chain segment, when a material is stressed, the molecular chain is easy to slide on the surfaces of microparticles of the inorganic filler reinforcing agent but is not easy to be separated from the microparticles of the inorganic filler reinforcing agent. The polysulfide rubber and the inorganic filler reinforcing agent form a strong bond capable of sliding, such that the mechanical strength thereof is increased.

Taking carbon black as an example: the carbon black is of an amorphous structure, and particles form an aggregate by means of physical and chemical combination. The primary structure of carbon black is formed by the aggregates, and meanwhile, the aggregates having Van der Waals' force or hydrogen bonds can be aggregated to form a spatial network structure, i.e., a secondary structure of carbon black. The surface of the carbon black has radicals such as hydrogen, carboxyl, lactonyl, free radical and quinonyl capable of being substituted, reduced, oxidized and the like. After the carbon black is blended into the polysulfide rubber, as a result of a strong interaction between the inorganic filler reinforcing agent and an interface of the polysulfide rubber molecular chain segment, when a material is stressed, the molecular chain is easy to slide on the surface of the carbon black but is not easy to be separated from the carbon black. The polysulfide rubber and the carbon black form a strong bond capable of sliding, such that the mechanical strength is increased.

In an embodiment, under a circumstance that the mass fraction of the polysulfide rubber is 100 parts, optionally, the mass fraction of the inorganic filler reinforcing agent is 15 to 85 parts, that is, the content of the inorganic filler reinforcing agent is 15% to 85% of a total amount of the polysulfide rubber. Taking the carbon black as an example of the inorganic filler reinforcing agent: when the mass fraction of the carbon black is 10, both the mechanical strength and the elongation at break of the polysulfide rubber material are relatively small; this is because the carbon black dispersed in a matrix unevenly hardly plays a reinforcing role due to a relatively small amount. With the increase of the adding amount of the carbon black, the mechanical strength of the polysulfide rubber material is increased, and the elongation at break thereof is decreased gradually. Under the circumstance, the prepared vibrating diaphragm may have a diaphragm breaking risk in long-term use. Thus, optionally, when the mass fraction of the polysulfide rubber is 15 to 85 parts, that is, the content of the inorganic filler reinforcing agent is 15% to 80% of a total amount of the polysulfide rubber, a requirement of the present disclosure on performance of the vibrating diaphragm can be better met. It is more ideal that the mass fraction of the inorganic filler reinforcing agent is 30 to 70 parts, that is, the content of the inorganic filler reinforcing agent is 30% to 70% of a total amount of the polysulfide rubber. Of course, those skilled in the art can make adjustment according to a specific requirement as appropriate, which is not limited herein.

Optionally, an antiaging agent can be blended in the polysulfide rubber. The antiaging agent, for example, can be at least one of antiaging agent N-445, antiaging agent 246, antiaging agent 4010, antiaging agent SP, antiaging agent RD, an antiaging agent ODA, antiaging agent OD and antiaging agent WH-02. Further, under a circumstance that the mass fraction of the polysulfide rubber is 100 parts, the mass fraction of the antiaging agent is 0.5 to 10 parts, that is, the content of the antiaging agent is 0.5% to 10% of a total amount of the polysulfide rubber.

With the elapse of time, the molecular chains of polysulfide rubber gradually break during use and generate dissociative free radicals to accelerate aging due to influence of factors such as oxygen and an ultraviolet lamp, known as the natural aging phenomenon of the polysulfide rubber. In the present disclosure, by blending the antiaging agent in the polysulfide rubber, a self-catalyzed active free radicals generated in polysulfide rubber can be prevented or suspended and alleviated. It is to be noted that if the adding amount of the antiaging agent is too small, an effect of prolonging the service life of the polysulfide rubber may not be achieved. If the adding amount of the antiaging agent is too large, as the antiaging agent is hardly inter-soluble with the polysulfide rubber fully and is hardly dispersed uniformly, the mechanical property of the polysulfide rubber may degrade in this case. Therefore, under a circumstance that the mass fraction of the polysulfide rubber is 100 parts, it is necessary to control the mass fraction of the antiaging agent at 0.5 to 10 parts. Preferably, the mass fraction of the antiaging agent is 1 to 5 parts, that is, the content of the antiaging agent is 1% to 5% of the total amount of the polysulfide rubber. Of course, those skilled in the art can make adjustments according to a specific requirement as appropriate, which is not limited herein.

Optionally, the plasticizer agent can be blended in the polysulfide rubber. The plasticizer is at least one of an aliphatic diester plasticizer, a phthalate plasticizer (for example, a phthalate plasticizer, a polyethylene terephthalate plasticizer), a benzene polyacid plasticizer, a benzoate plasticizer, a polyalcohol ester plasticizer, a chlorinated hydrocarbon plasticizer, an epoxy plasticizer, a citrate plasticizer and a polyester plasticizer.

Molecules of the plasticizer are much smaller than those of polysulfide rubber. They are easy to move to provide a space needed by movement to a chain segment conveniently, thereby reducing glass-transition temperature of the material, increasing cold resistance of the material and improving the machining property of the material. Excessive plasticizer, on the contrary, will separate from the interior of the material and reduce the mechanical property of the material. With the increase of the dosage of the plasticizer, the glass-transition temperature of the material is decreased.

In an embodiment, under the circumstance that the mass fraction of the polysulfide rubber is 100 parts, optionally, the mass fraction of the plasticizer is 1 to 10 parts, that is, the content of the plasticizer is 1% to 10% of a total amount of the polysulfide rubber. Actually, with increase of the dosage of the plasticizer, the glass-transition temperature of the polysulfide rubber material is decreased, but correspondingly, the tensile strength of the v polysulfide rubber will be reduced, too. When the content of the plasticizer is 12, the tensile strength of the polysulfide rubber is reduced to a great extent. In addition, excessive plasticizer will be separated out from the interior of the polysulfide rubber material, such that the mechanical property of the polysulfide rubber material will be reduced. When the mass fraction of the plasticizer meets the range, it can be ensured that performance of the polysulfide rubber can meet the requirement on performance of the vibrating diaphragm. Preferably, the mass fraction of the plasticizer is 3 to 7 parts, that is, the content of the plasticizer is 3% to 7% of the total amount of the plasticizer. Of course, those skilled in the art can make adjustment according to a specific requirement as appropriate, which is not limited herein.

Optionally, a internal releasing agent can be blended in the polysulfide rubber. The internal releasing agent is at least one of stearic acid, octadecylamine, alkyl phosphate and α-octadecyl-ω-hydroxyl polyoxyethylene phosphate.

Both Mooney viscosity and rubberizing strength of the polysulfide rubber are relatively low. The performance characteristic will lead to process problems roll coating and mold coating and the like in an injection molding process of polysulfide rubber. By way of adding the internal releasing agent into the sizing material of the polysulfide rubber, the processability thereof is improved.

If the mixing quantity of the internal releasing agent is relatively small, it will be difficult to improve the problem of mold coating. However, if the mixing amount of the internal releasing amount is too large, the bonding force of the polysulfide rubber with the adhesive layer is decreased when the vibrating diaphragm is prepared in later period, such that the performance of the finally prepared vibrating diaphragm is influenced. In the embodiment of the present disclosure, under a circumstance that the mass fraction of the polysulfide rubber is 100 parts, the mass fraction of the internal releasing agent is 0.5 to 5 parts, that is, the content of the internal releasing agent is 0.5 to 5% of a total amount of the polysulfide rubber. Preferably, the mass fraction of the internal releasing agent is 1 to 3 parts, that is, the content of the internal releasing agent is 1 to 3% of the total amount of the polysulfide rubber. Of course, those skilled in the art can make adjustment according to a specific requirement as appropriate, which is not limited herein.

Optionally, the crosslinking agent can be blended in the polysulfide rubber. Optionally, the crosslinking agent is at least one of sulfur and a thiuram polysulfide.

The sulfur can shorten the vulcanizing time and improve the hardness, the compressive deformation resistance and elastic modulus of the vulcanized rubber.

The thiuram polysulfide is at least one of tetramethylthiuram monosulfide, tetramethylthiuram disulfide, tetraethylthiuram disulfide, tetrabutylthiuram disulfide, diisobutylthiuram disulfide, bis(1,5-pentylidene) thiuram tetrasulfide.

The thiuram polysulfide is a vulcanizer of a sulfur-free system, which can vulcanize rubber directly if being used independently. After the temperature is raised to the vulcanizing temperature, a sulfur-containing compound is split to active sulfur. As the structure of the sulfide is different, the sulfur contents are different, too. In the vulcanizing process, the sulfur-containing compound is heated to be split to free radicals which are then acted with α-methyne in the polysulfide rubber to complete vulcanizing action according to a reaction of a free radial chain. Under a circumstance of no zinc oxide, it is decomposed to dimethylamine and carbon disulfide, and a decomposed product plays a role of promoting oxidization of rubber, such that the aging performance is decreased severely. Under a circumstance of presence of zinc oxide, it can be reacted to generate zinc dimethyldithiocarbamate which plays a positive role in aging resistance of the rubber.

It is to be noted that the crosslinking agent and crosslinking points generated thereby can determine the crosslinking degree of the polysulfide rubber. Within a certain range, the more the crosslinking points are, the larger the dosage of the crosslinking agent is and the higher the crosslinking degree is. However, it is hard for the molecular chain to move as the crosslinking degree is too high, which leads to increase of the glass-transition temperature and increase of damping factor of the polysulfide rubber. Furthermore, the higher the mechanical strength of the polysulfide rubber material is, the elongation at break and the elastic recovery rate are reduced. Those skilled in the art can control the dosage of the crosslinking agent reasonably according to a specific demand.

Optionally, a glass-transition temperature of the vibrating diaphragm ranges: from −70° C. to 0° C. As the polysulfide rubber has a relatively high molecular weight (for example, the molecular weight can reach up to 1000-500000) and the molecular chain thereof is relatively flexible, the polysulfide rubber is relatively good in low-temperature resistance.

When the vibrating diaphragm meets the range of the glass-transition temperature, the vibrating diaphragm of the sound-producing apparatus can be kept at high elasticity at a constant temperature, such that the vibrating diaphragm is good in rebound resilience. Within a certain range, as the glass-transition temperature is lower, the vibrating diaphragm can work normally at a lower temperature. Under the circumstance that the thickness of the vibrating diaphragm is not changed, the lower the glass-transition temperature is, the lower the resonant frequency F0 of the assembled sound-producing apparatus is. The glass-transition temperature of the material can be adjusted by changing the content of the inorganic filler reinforcing agent and the content of the plasticizer in the polysulfide rubber.

In an embodiment, the glass-transition temperature of the vibrating diaphragm provided by the present disclosure is preferably −50° C. to 0° C. The vibrating diaphragm not only maintains high elasticity at normal temperature, but also is good in rebound resilience. It is of more importance that even at a temperature below 0° C., the vibrating diaphragm of the sound-producing apparatus still can keep relatively good rubber elasticity, such that the sound-producing apparatus shows relatively high tone quality. Meanwhile, the risk of breaking the vibrating diaphragm of the sound-producing apparatus in the low-temperature environment is reduced, thereby improving the reliability.

Optionally, the elongation at break of the vibrating diaphragm is greater than 100%. Optionally, the elongation at break of the vibrating diaphragm is greater than 150%. The vibrating diaphragm provided by the present disclosure is relatively high in elongation at break, such that the reliability problems such as diaphragm breakage is not prone to occur when the vibrating diaphragm is used in the sound-producing apparatus.

Under the same stress, the strain of the vibrating diaphragm provided by the embodiment of the present disclosure is obviously smaller than that of the PEEK vibrating diaphragm in the prior art. It proves that the Young modulus of the vibrating diaphragm provided by the embodiment of the present disclosure is obviously smaller than that of the PEEK vibrating diaphragm in the prior art.

In addition, the PEEK vibrating diaphragm in the prior art forms an obvious yield point which is about 0.4 to 0.5% of strain. The vibrating diaphragm provided by the present disclosure is free of yield point. It proves that the vibrating diaphragm provided by the present disclosure has a wider elastic area and excellent resilience.

The vibrating diaphragm prepared by the polysulfide rubber has good flexibility. For example, the elongation at break thereof is greater than or equal to 100%. The polysulfide rubber molecular chain has important influence on elongation at break and those skilled in the art can select according to an actual need. The vibration displacement of the vibrating diaphragm of the sound-producing apparatus is larger and the loudness is higher. Further, it is good in reliability and durability. The better the flexibility of the polysulfide rubber material is, the greater the elongation at break is, and the higher the ability of the vibrating diaphragm resisting damage is. When the vibrating diaphragm vibrates in a large vibrating amplitude state, the polysulfide rubber generates relative large strain, and the vibrating diaphragm material has the risk of diaphragm fold, diaphragm rupture or diaphragm damage during long-time vibration. By contrast, the vibrating diaphragm taking polysulfide rubber as a base material has good flexibility, thereby reducing the risk of breaking the vibrating diaphragm. The higher the elongation at break is, the lower the diaphragm rupture rate of the vibrating diaphragm in long-term use is.

Compared with the engineering plastics, the polysulfide rubber material has a wider elastic area. When strain of the vibrating diaphragm occurs in the area, the vibrating diaphragm is excellent in resilience after removing an external force. Correspondingly, there is less rocking vibration of the vibrating diaphragm in the vibrating process, and the tone quality and audition stability are more excellent. Further, the vibrating diaphragm provided by the present disclosure can be used continuously at a high temperature and compared with an existing material, and is higher in damping capacity. As the vibrating diaphragm is good in rebound resilience, the sound-producing apparatus has relatively good transient response and relatively low distortion.

As shown in FIG. 1, the vibrating diaphragm provided by the present disclosure has a lower THD (total harmonic distortion) compared with that of the PEEK vibrating diaphragm in the prior art. It proves that the vibrating diaphragm provided by the present disclosure has a more excellent anti-polarization ability and is more excellent in tone quality.

The vibrating diaphragm provided by the present disclosure possesses high elasticity at room temperature, its molecular chain is easy to move, its intermolecular friction force is large, and the vibrating diaphragm is relatively good in damping capacity. Optionally, the loss factor of the vibrating diaphragm at room temperature is greater than 0.06. Due to the excellent damping property, the vibrating diaphragm has lower impedance. The damping property of the vibrating diaphragm is improved, and a vibrating system of the sound-producing apparatus is high in ability of inhibiting a polarization phenomenon in a vibrating process, such that the vibrating consistence is good. The vibrating diaphragm made from the existing engineering plastic is low in damping, the loss factor thereof is usually smaller than 0.01, and its damping property is small.

Preferably, the loss factor of the vibrating diaphragm at room temperature is greater than 0.1.

Figure 2:
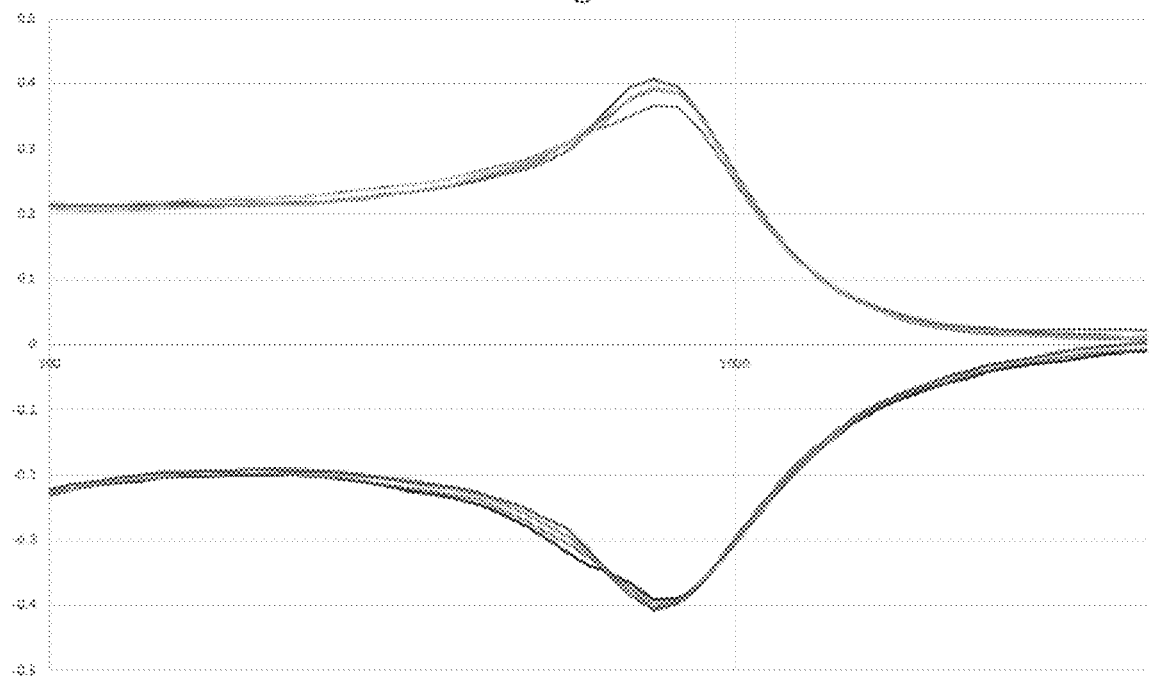
FIG. 2 shows a test curve of vibration displacement of different parts of the vibrating diaphragm of the sound-producing apparatus of an embodiment of the present disclosure at different frequencies.
Figure 3:
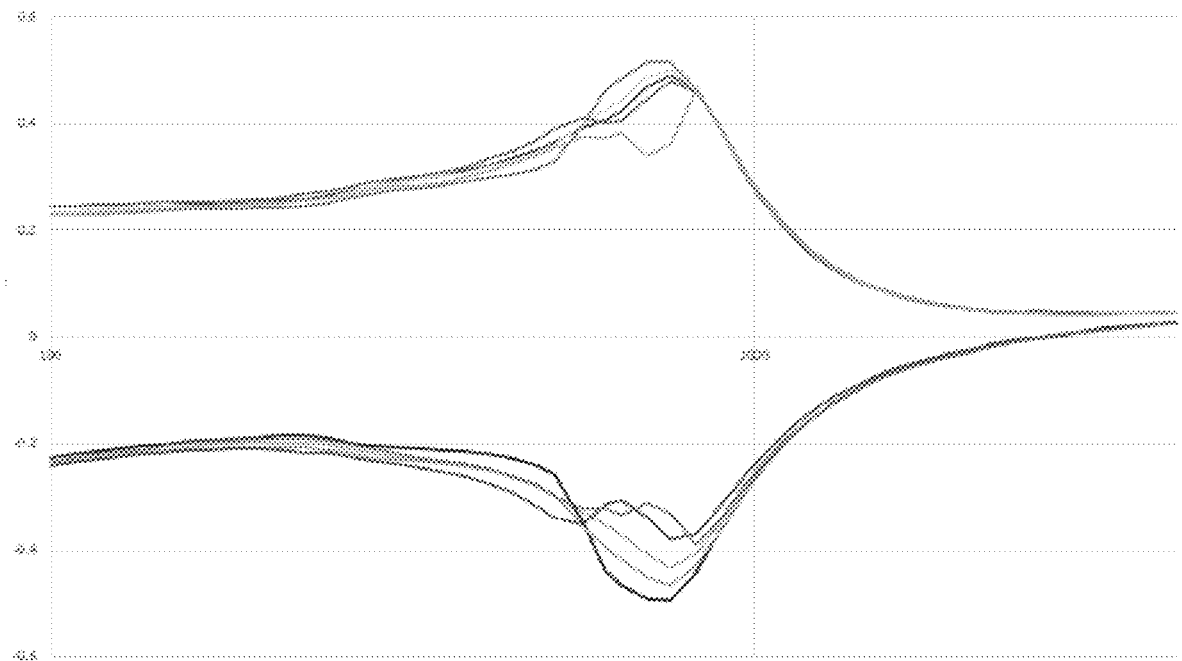
FIG. 3 shows a test curve of vibration displacement of different parts of an existing vibrating diaphragm at different frequencies.

FIG. 2 shows a test curve of vibration displacement of different parts of the vibrating diaphragm of the sound-producing apparatus of an embodiment of the present disclosure at different frequencies. FIG. 3 shows a test curve of vibration displacement of different parts of the conventional vibrating diaphragm at different frequencies.

The vibrating diaphragm is a rectangular corrugated rim vibrating diaphragm. The transverse coordinate is frequency (Hz) and the vertical coordinate is loudness displacement (mm). Points in an edge position and a center position of a central portion of the vibrating diaphragm are acquired for testing.

It can be seen that the curves in the FIG. 2 are more centralized, while the curves in the FIG. 3 are relatively dispersed. It proves that the parts of the vibrating diaphragm provided by the embodiment of the present disclosure are better in vibrating consistence. In the vibrating process, there is less rocking vibration of the vibrating diaphragm and the tone quality and audition stability are more excellent.

The shore hardness of the vibrating diaphragm provided by the present disclosure is in a range of 30A to 95A. The resonant frequency F0 of the sound-producing apparatus is in direct proportion to the modulus and thickness of the vibrating diaphragm. As far as the polysulfide rubber material is concerned, the modulus thereof is in direct proportion to the hardness. Thus, the modulus of the vibrating diaphragm can be reflected by hardness.

Figure 4:
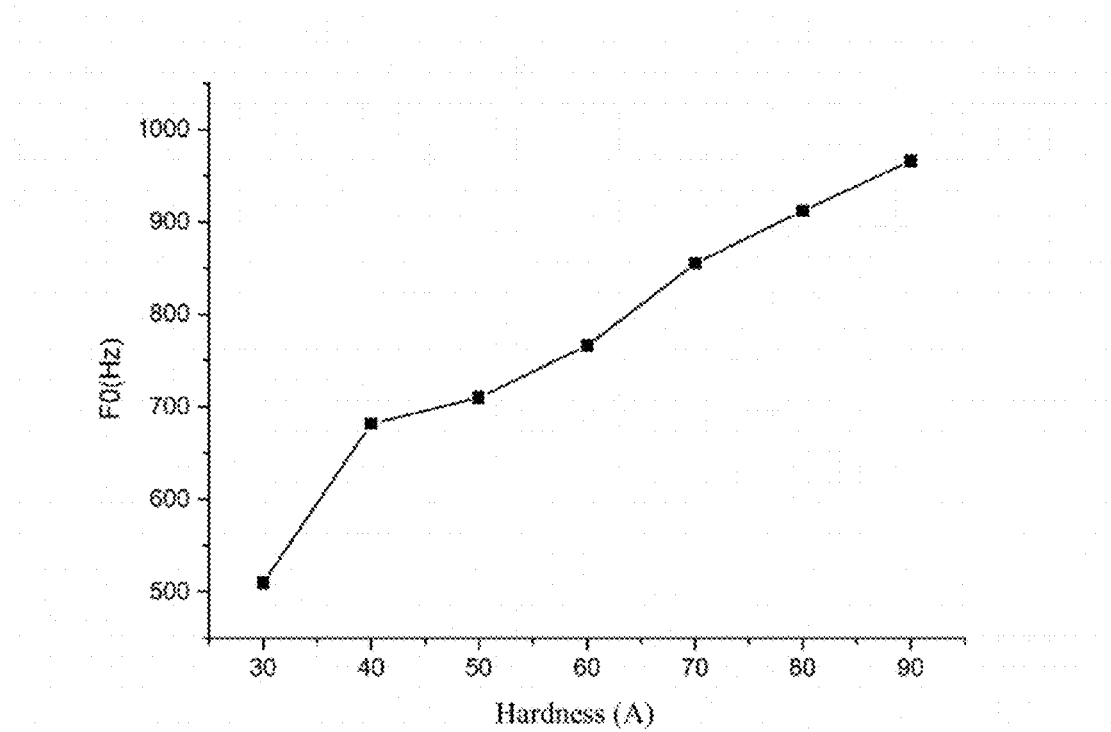
FIG. 4 shows an impedance curve of the vibrating diaphragms with different hardness.

On one hand, strength and hardness of the polysulfide rubber material can be adjusted by the reinforcing agent. On the other hand, increased molecular chain weight will cause the number of the intermolecular hydrogen bonds to increase, thereby increasing strength and hardness of the polysulfide rubber as well as number of the crosslinking points. The higher the strength and hardness of the polysulfide rubber material are, the higher the F0 of the vibrating diaphragm material is, and correspondingly reducing loudness of the sound-producing apparatus and degrading the low pitch performance. FIG. 4 shows an impedance curve of the vibrating diaphragms with different hardness and with same thickness. It can be seen from the FIG. 4 that with increase of hardness, the resonant frequency F0 of the sound-producing apparatus is rapidly increased.

The vibrating diaphragm of the sound-producing apparatus provided by the present disclosure can be a corrugated rim vibrating diaphragm or a plate vibrating diaphragm. The resonant frequency F0 of the sound-producing apparatus is in direct proportion to the Young modulus and thickness of the vibrating diaphragm, and change of F0 can be realized by changing the thickness and the Young modulus of the vibrating diaphragm. A specific adjusting principle is as follows:

$$F0 = \frac{1}{2\pi}\sqrt{\frac{1}{CmsMms}};$$

wherein Mms is the equivalent vibrating mass of the sound-producing apparatus, and Cms is the equivalent compliance of the sound-producing apparatus;

$$Cms = \frac{(C_{m1} * C_{m2})}{(C_{m1} + C_{m2})};$$

wherein $C_{m1}$ is the damper compliance and $C_{m2}$ is the vibrating diaphragm compliance. In a design without a damper, the equivalent compliance of the sound-producing apparatus is the vibrating diaphragm compliance:

$$C_{m2} = \frac{(1-u^3)W^3}{\pi(W+dvc)t^3 E a_1 a_2};$$

wherein W is the total width of a corrugated rim part of the vibrating diaphragm, t is the thickness of the diaphragm, dvc is the fitting outer diameter of a voice coil fitted to the vibrating diaphragm, E is the Young modulus of the vibrating diaphragm material, and u is the Poisson ratio of the vibrating diaphragm material.

It can be seen that the resonant frequency F0 of the sound-producing apparatus is in direct proportion to the modulus and thickness of the vibrating diaphragm. Further, the modulus of the vibrating diaphragm is in direct proportion to its hardness. Thus, its modulus can be replaced by hardness. In order to obtain full low pitch and comfortable hearing feeling, the vibrating diaphragm should have enough rigidity and damping while the miniature sound-producing apparatus has relatively low resonant frequency F0. Those skilled in the art can adjust the amplitude of F0 by adjusting hardness and thickness of the vibrating diaphragm of a speaker.

The shore hardness of the vibrating diaphragm is preferably 30 to 80A, and the hardness of the vibrating diaphragm is 30 μm to 120 μm. In the preferred range, the resonant frequency F0 of the sound-producing apparatus reaches 150 to 1500 Hz. The low frequency performance of the sound-producing apparatus is excellent.

Optionally, the vibrating diaphragm provided by the present disclosure can either be a single-layered vibrating diaphragm or a multilayered composite vibrating diaphragm. The single-layered vibrating diaphragm is a vibrating diaphragm composed of one polysulfide rubber film layer. The composite vibrating diaphragm is the vibrating diaphragm formed by stacking multiple polysulfide rubber film layers in sequence. Alternatively, the composite vibrating diaphragm can include at least one polysulfide rubber film layer, and the polysulfide rubber film layer is combined with the film layer prepared by other materials layer by layer to form the composite vibrating diaphragm prepared by various materials. In addition, multiple film layers can be combined by way of hot-pressing and the like, thereby forming the composite vibrating diaphragm. The composite vibrating diaphragm may include two, three, four or five film layers, which is not limited here. At least one film layer in the composite vibrating diaphragm is the polysulfide rubber film layer prepared from the polysulfide rubber provided by the present disclosure.

The thickness of the polysulfide rubber film layer is 10 μm to 200 μm, preferably, 30 μm to 120 μm. When the thickness of the polysulfide rubber film layer is in the range, demands on performance of the sound-producing apparatus and on space for assembling can be better met.

In addition, thickness of the vibrating diaphragm will influence its acoustic performance. Normally, the relatively low thickness will influence the reliability of the vibrating diaphragm and the relatively high thickness will influence the sensitivity of the vibrating diaphragm. Thus, the thickness of the vibrating diaphragm provided by the present disclosure can be controlled for example in the range of 30 μm to 120 μm. When the thickness range of the single-layered polysulfide rubber is 30 μm to 120 μm, this thickness range can increase the sensibility of the vibrating diaphragm of the sound-producing apparatus, and both the elastic performance and the rigid performance of the vibrating diaphragm meet the manufacturing requirement of the sound-producing apparatus. The vibrating diaphragm can be in particular applied to a miniature sound-producing apparatus. As the most fragile component in the sound-producing apparatus, the vibrating diaphragm can further guarantee long-term normal use in a repeated vibrating process, thereby prolonging the service life of the sound-producing apparatus.

Figure 5:
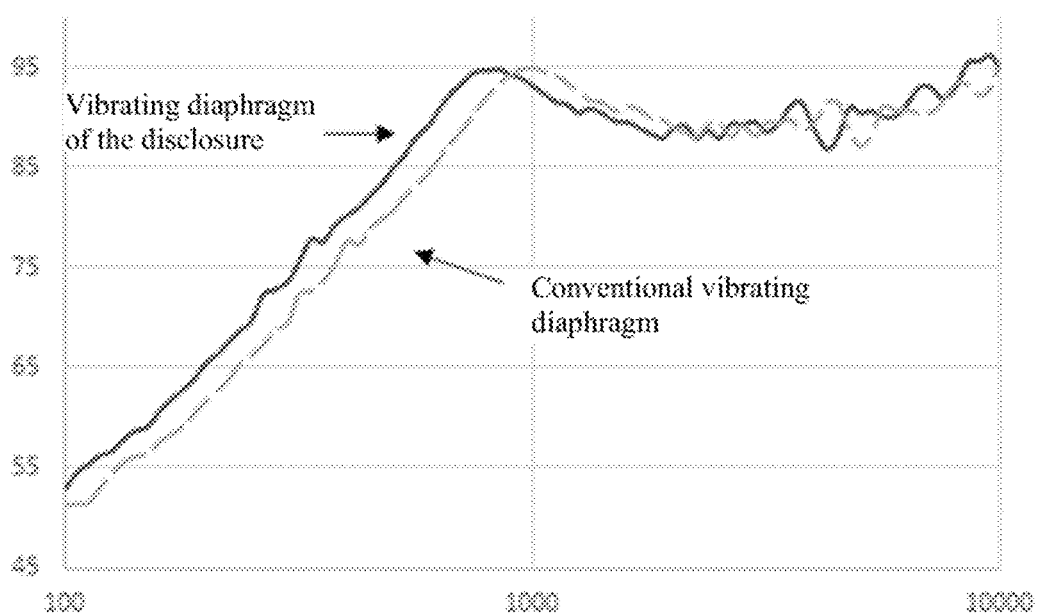
FIG. 5 shows a test curve comparison diagram of loudness of the vibrating diaphragm provided by the present disclosure and an existing conventional vibrating diaphragm.

The present disclosure further provides a comparison plot between a specific embodiment of the vibrating diaphragm provided by the present disclosure and the existing conventional vibrating diaphragm, as shown in the FIG. 5. FIG. 5 shows a test curve (SPL curve) of loudness of the two kinds of vibrating diaphragms at different frequencies. The vibrating diaphragms are rectangular corrugated rim vibrating diaphragms. The transverse coordinate is frequency (Hz) and the vertical coordinate is loudness.

In the FIG. 5, the solid line is a test curve provided by the present disclosure. The dotted line is a test curve of the conventional vibrating diaphragm. It can be seen from the SPL curve that the intermediate frequency performance of the two vibrating diaphragms are similar. The F0 of the sound-producing apparatus of the vibrating diaphragm provided by the present disclosure is 832 Hz. The F0 of the sound-producing apparatus of the conventional vibrating diaphragm is 926 Hz. It proves that the low frequency sensitivity of the vibrating diaphragm provided by the present disclosure is better than that of an existing PEEK vibrating diaphragm. That is, the sound-producing apparatus adopting the vibrating diaphragm provided by the present disclosure is higher in loudness and comfort level.

The vibrating diaphragm provided by the present disclosure is prepared by mixing the polysulfide rubber material with an auxiliary agent and conducting hot pressing by integral formation, and its forming temperature must be higher than the vulcanizing temperature of the rubber. The vibrating diaphragm provided by the present disclosure is simple in preparation method, can be normally used under the condition of extremely high or low temperatures, and also takes into consideration rigidity, rebound resilience and damping property of the vibrating diaphragm.

On the other hand, further provided is a sound-producing apparatus.

The sound-producing apparatus includes a sound-producing apparatus main body and the vibrating diaphragm made from the polysulfide rubber. The polysulfide rubber may be any one of type A polysulfide rubber, type FA polysulfide rubber and type ST polysulfide rubber, which is not limited herein. The vibrating diaphragm is provided on the sound-producing apparatus main body and the vibrating diaphragm is configured to vibrate to generate a sound. The sound-producing apparatus main body can be provided with components such as a coil and a magnetic circuit system, and the vibrating diaphragm is driven to vibrate by electromagnetic induction. The sound-producing apparatus provided by the present disclosure has excellent acoustic performance.

Although detailed description to some specific embodiments of the present disclosure has been made by way of illustration, those skilled in the art understand that the examples are used for explanation only, rather than to limit the scope of the present disclosure. Those skilled in the art understand that modifications on the embodiment can be made without departing from the scope or the spirit of the present disclosure. The scope of the present disclosure is limited by the appended claims.

The invention claimed is:

1. A vibrating diaphragm of a sound-producing apparatus, the vibrating diaphragm comprising at least one elastomer layer made from polysulfide rubber;
wherein the polysulfide rubber is selected from the group consisting of a type A polysulfide rubber, a type FA polysulfide rubber and a type ST polysulfide rubber; and
wherein a molecular weight of the polysulfide rubber is 1000-500000,
wherein the polysulfide rubber comprises a polysulfide rubber having a molecular structural formula as follows:

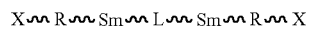

wherein R is a bivalent organic radical;
L is a polysulfide rubber molecular chain segment;
X is any one of sulfhydryl, hydroxyl, halogen, amino and amide; and
m is 1 or 2.

2. The vibrating diaphragm of claim 1, wherein the R comprises any one of the following bivalent organic radicals:

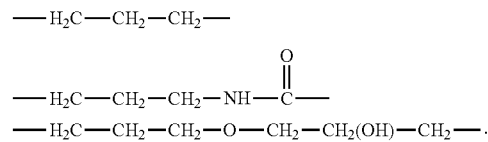

3. The vibrating diaphragm of claim 1, further comprising an inorganic filler reinforcing agent blended in the polysulfide rubber, wherein the inorganic filler reinforcing agent is selected from the group consisting of carbon black, white carbon black, nano titanium dioxide, talc powder, precipitated calcium carbonate and barium sulfate, and a content of the inorganic filler reinforcing agent is 15% to 90% of a total amount of the polysulfide rubber.

4. The vibrating diaphragm of claim 3, wherein the content of the inorganic filler reinforcing agent is 30% to 70% of the total amount of the polysulfide rubber.

5. The vibrating diaphragm of claim 1, further comprising an antiaging agent blended in the polysulfide rubber, wherein the antiaging agent is selected from the group consisting of antiaging agent N-445, antiaging agent 246, antiaging agent 4010, antiaging agent SP, antiaging agent RD, antiaging agent ODA, antiaging agent OD and antiaging agent WH-02, and the content of the antiaging agent is 0.5% to 10% of the total amount of the polysulfide rubber.

6. The vibrating diaphragm of claim 5, wherein the content of the antiaging agent is 1% to 5% of the total amount of the polysulfide rubber.

7. The vibrating diaphragm of claim 1, further comprising a plasticizer blended in the polysulfide rubber, wherein the plasticizer is selected from the group consisting of an aliphatic diester plasticizer, a phthalate plasticizer, a benzene polyacid plasticizer, a benzoate plasticizer, a polyalcohol ester plasticizer, a chlorinated hydrocarbon plasticizer, an epoxy plasticizer, a citrate plasticizer and a polyester plasticizer, and the content of the plasticizer is 1% to 10% of the total amount of polysulfide rubber.

8. The vibrating diaphragm of claim 7, wherein the content of the plasticizer is 3% to 7% of the total amount of the polysulfide rubber.

9. The vibrating diaphragm of claim 1, further comprising an internal releasing agent blended in the polysulfide rubber, wherein the internal releasing agent is selected from the group consisting of stearic acid, octadecylamine, alkyl phosphate and α-octadecyl-ω-hydroxyl polyoxyethylene phosphate, and the content of the internal releasing agent is 0.5% to 5% of the total amount of the polysulfide rubber.

10. The vibrating diaphragm of claim 9, wherein the content of the internal releasing agent is 1% to 3% of the total amount of the polysulfide rubber.

11. The vibrating diaphragm of claim 1, further comprising a crosslinking agent blended in the polysulfide rubber, and the crosslinking agent is selected from the group consisting of sulfur and a thiuram polysulfide.

12. The vibrating diaphragm of claim 11, wherein the thiuram polysulfide is selected from the group consisting of tetramethylthiuram monosulfide, tetramethylthiuram disulfide, tetraethylthiuram disulfide, tetrabutylthiuram disulfide, diisobutylthiuram disulfide, bis(1,5-pentylidene) thiuram tetrasulfide.

13. The vibrating diaphragm of claim 1, wherein the vibrating diaphragm is selected from the group consisting of:
a single-layered vibrating diaphragm comprising one polysulfide rubber film layer; and a composite vibrating diaphragm comprising two, three, four or five film layers, including at least one polysulfide rubber film layer.

14. The vibrating diaphragm of claim 13, a thickness of the polysulfide rubber film layer is 10 μm to 200 μm.

15. The vibrating diaphragm of claim 1, wherein a hardness of the polysulfide rubber is 30A to 95A.

16. The vibrating diaphragm of claim 1, wherein a glass-transition temperature of the polysulfide rubber ranges from −70° C. to 0° C.

17. The vibrating diaphragm of claim 1, wherein a loss factor of the polysulfide rubber at a room temperature is greater than 0.06.

18. The vibrating diaphragm of claim 1, wherein an elongation at break of the polysulfide rubber is greater than 100%.

19. A sound-producing apparatus, comprising a sound-producing apparatus main body and the vibrating diaphragm of claim 1, the vibrating diaphragm being provided on the sound-producing apparatus main body and the vibrating diaphragm being configured to vibrate to generate a sound.

\* \* \* \* \*